J. Melder, Self heating Sad Iron.
No. 120,450. Fig. 1. Patented Oct. 31, 1871
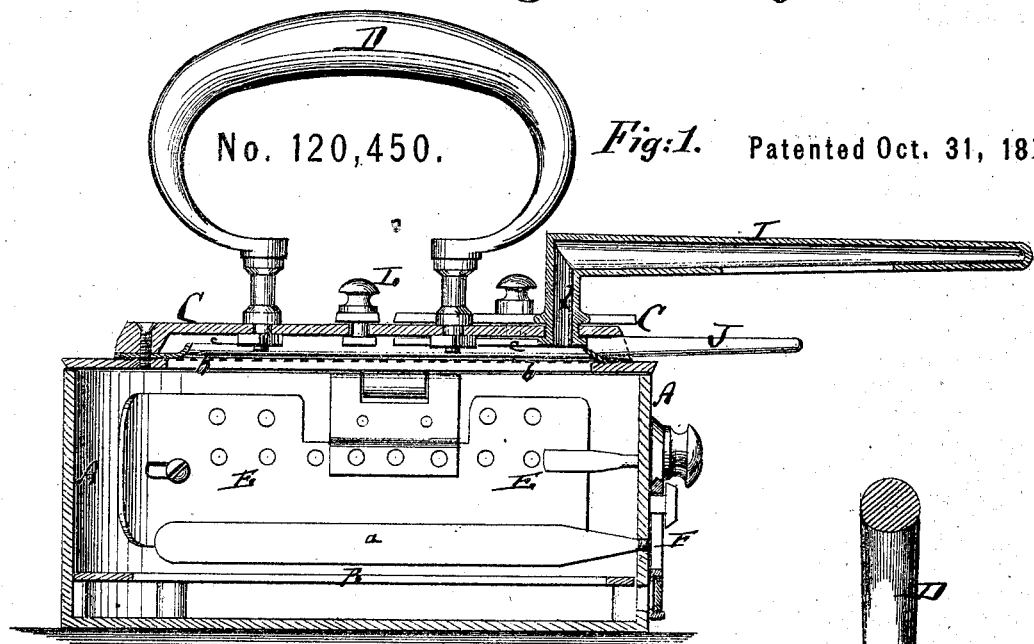
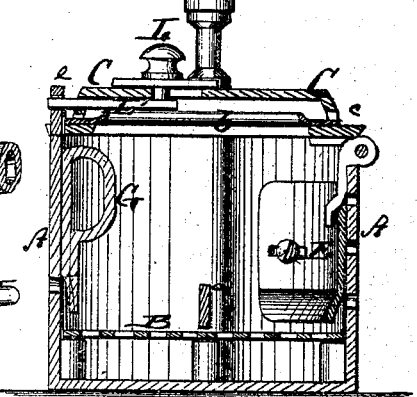
Fig. 3.
Fig. 2.
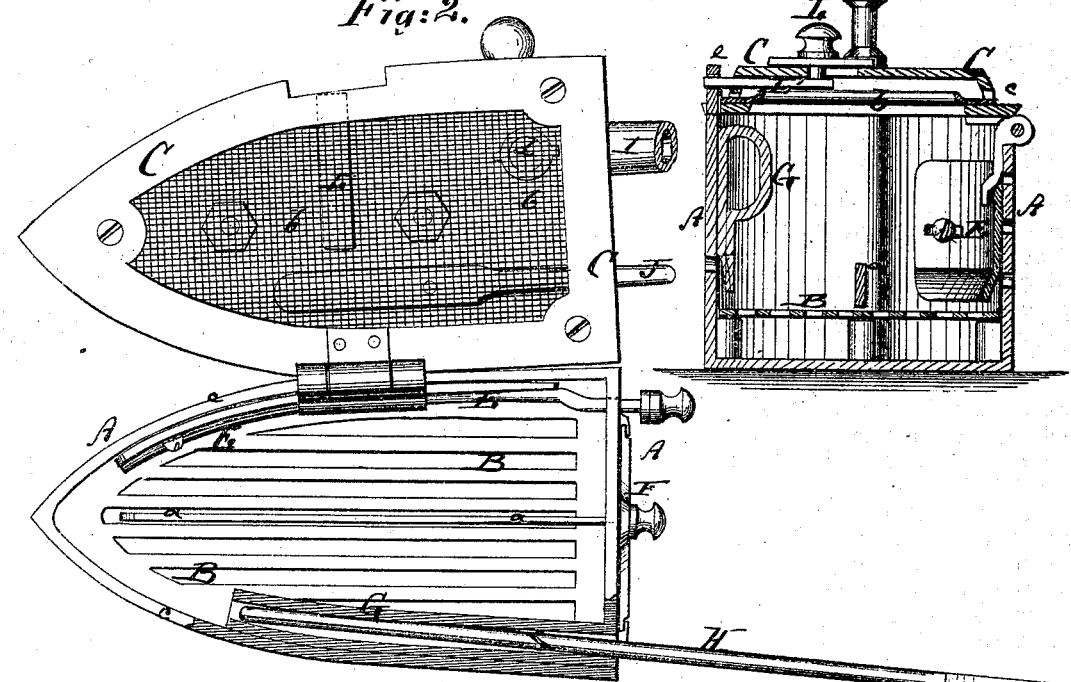
Witnesses:
M. Vorlaender
Alex F. Roberts
Inventor:
J. Melder
per Munn & Co.
Attorneys.

UNITED STATES PATENT OFFICE.

JOSEPH MELDER, OF MÜNCHEN, BAVARIA.

IMPROVEMENT IN SELF-HEATING SAD-IRONS.

Specification forming part of Letters Patent No. 120,450, dated October 31, 1871.

*To all whom it may concern:*

Be it known that I, JOSEPH MELDER, of München, in Bavaria, have invented a new and Improved Self-Heating Sad-Iron; and I do hereby declare that the following is a full, clear, and exact description thereof, which will enable others skilled in the art to make and use the same, reference being had to the accompanying drawing forming part of this specification, in which—

Figure 1 represents a vertical longitudinal section of my improved self-heating sad-iron. Fig. 2 is a plan or top view of the same, showing it opened. Fig. 3 is a vertical transverse section of the same.

Similar letters of reference indicate corresponding parts.

This invention relates to a new self-heating sad-iron, which is so constructed that it will consume all the products of combustion before the same can escape, thereby avoiding inconvenience from smoke and gas. The invention consists in the application to the heater of plates and wire-gauze, which, when heated by the fire, will serve to consume the products of combustion. The invention consists also in the arrangement of receptacles for heating crimping and curling-irons, the said irons being either removable or adjustable, as hereinafter more fully described.

A in the drawing represents a sad-iron, which contains a grate, B, and a hinged cover, C. A handle, D, of suitable kind, is affixed to the cover. Above the grate is arranged, within the sad-iron, a longitudinal bar, *a*, which, when heated by the fire on the grate, serves to aid in the consumption of products of combustion. A wire screen, *b*, stretched under the cover below apertures *c c* in the sides of the same, serves also, when heated, to consume all combustible matter in the gases that pass through its meshes. One side of the sad-iron is perforated and its apertures are closed by a perforated slide, E, which, when pulled forward by means of its projecting-handle, will bring its apertures in line with those in the side of the iron to let the gas escape through the same. This slide is to aid in starting the fire. In the front of the sad-iron is a draught-opening, which can be closed by means of a vertically-adjustable gate, F. A pocket or case, G, is secured longitudinally within the sad-iron with an opening at one end. It serves to receive and heat a pair of curling-tongs, H. I is a tubular crimping-iron, whose shank *d* is fitted into an aperture of the cover to be heated by the ascending gases. Another smaller crimping-iron, J, is, in form of a sliding bolt, connected with the cover. L is a handle or knob connecting with the bar L' which is beneath the cover. By turning the handle the bar may be caused to lock into an ear or lug, *e*, of the lower case for the purpose of securing the cover.

Having thus described my invention, I claim as new and desire to secure by Letters Patent—

1. A self-heating sad-iron provided with the heating-bar *a* and wire screen *b*, or either, for consuming the products of combustion, in the manner specified.

2. The pocket G arranged on a self-heating sad-iron for receiving and heating the curling-tongs, as set forth.

3. The crimping-irons I J arranged on the cover of a self-heating sad-iron, for the purpose and substantially as herein shown and described.

The above specification of my invention signed by me this 5th day of November, 1870.

JOSEPH MELDER. [L. S.]

Witnesses:
JOHANN SCHNEIDER,
JOH. NEUMAIER.